US012294753B2

(12) United States Patent
Aher et al.

(10) Patent No.: US 12,294,753 B2
(45) Date of Patent: May 6, 2025

(54) GENERATING MEDIA CONTENT KEYWORDS BASED ON VIDEO-HOSTING WEBSITE CONTENT

(71) Applicant: Adeia Guides, Inc., San Jose, CA (US)

(72) Inventors: Ankur Anil Aher, Maharashtra (IN); Aman Puniyani, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/650,748

(22) Filed: Apr. 30, 2024

(65) Prior Publication Data

US 2024/0406479 A1     Dec. 5, 2024

Related U.S. Application Data

(63) Continuation of application No. 17/992,255, filed on Nov. 22, 2022, now Pat. No. 12,015,814, which is a continuation of application No. 16/953,133, filed on Nov. 19, 2020, now Pat. No. 11,539,994, which is a continuation of application No. 16/220,663, filed on Dec. 14, 2018, now Pat. No. 10,897,639.

(51) Int. Cl.
| | |
|---|---|
| H04N 21/25 | (2011.01) |
| H04N 21/235 | (2011.01) |
| H04N 21/278 | (2011.01) |
| H04N 21/433 | (2011.01) |

(52) U.S. Cl.
CPC ....... *H04N 21/252* (2013.01); *H04N 21/2353* (2013.01); *H04N 21/278* (2013.01); *H04N 21/4332* (2013.01)

(58) Field of Classification Search
CPC ............ H04N 21/252; H04N 21/2353; H04N 21/278; H04N 21/4332
See application file for complete search history.

(56) References Cited

U.S. PATENT DOCUMENTS

| | | |
|---|---|---|
| 7,761,892 B2 | 7/2010 | Ellis et al. |
| 7,831,582 B1 | 11/2010 | Scofield et al. |
| 9,058,332 B1 | 6/2015 | Darby et al. |

(Continued)

OTHER PUBLICATIONS

European Search Report for European Application No. 19216198.2, dated Mar. 6, 2020 (8 pages), Mar. 6, 2020.

(Continued)

*Primary Examiner* — Kyu Chae
(74) *Attorney, Agent, or Firm* — Haley Guiliano LLP

(57) ABSTRACT

Systems and methods for generating media program keywords based on a video-hosting website are disclosed herein. Control circuitry identifies, on the video-hosting website, video content items that include at least a portion of a media program. The media program has a media program identifier and the video content items have respective titles, each including one or more terms. The control circuitry identifies a term included in more than one of the titles and identifies a group of the video content items that have the term included in their title. Based on the video-hosting website, the control circuitry determines a cumulative number of rankings of the video content items within the group and generates a relevance score for the term based on the cumulative number of rankings. The control circuitry stores the term and the relevance score in a keyword database in association with the media program identifier.

20 Claims, 6 Drawing Sheets

(56) References Cited

U.S. PATENT DOCUMENTS

| | | |
|---|---|---|
| 10,897,639 B2 | 1/2021 | Aher et al. |
| 11,539,994 B2 | 12/2022 | Aher et al. |
| 2009/0012965 A1 | 1/2009 | Franken |
| 2010/0169369 A1 | 7/2010 | Wang et al. |
| 2011/0264682 A1 | 10/2011 | Song et al. |
| 2012/0159543 A1 | 6/2012 | Jin et al. |
| 2013/0080445 A1* | 3/2013 | Gogan ............. G06F 16/4387 |
| | | 707/E17.014 |
| 2014/0149865 A1 | 5/2014 | Tanaka et al. |
| 2015/0293995 A1 | 10/2015 | Chen et al. |
| 2016/0071549 A1 | 3/2016 | Von et al. |
| 2016/0078035 A1 | 3/2016 | Ball et al. |
| 2016/0127794 A1 | 5/2016 | Chang |
| 2017/0017658 A1* | 1/2017 | Blong ............... G06F 16/4393 |
| 2017/0060870 A1* | 3/2017 | Checkley ........ G06F 16/9535 |
| 2017/0270203 A1 | 9/2017 | Liu |
| 2018/0101540 A1* | 4/2018 | Stoop ............... G06F 16/7867 |
| 2018/0314976 A1 | 11/2018 | Miao et al. |
| 2019/0139576 A1* | 5/2019 | Delaney ............ G06F 40/30 |
| 2020/0195989 A1 | 6/2020 | Aher et al. |
| 2021/0144424 A1 | 5/2021 | Aher et al. |
| 2023/0145506 A1 | 5/2023 | Aher et al. |

OTHER PUBLICATIONS

Chen, Zhineng, "Web Video Retagging", Chen, et al., "Web Video Retagging," Multimed Tools Application, 55:53-82 (2011), 2011, 53-82.

Santos-Neto, Elizeu, "Towards Boosting Video Popularity via Tag Selection", Santos-Neto, et al., "Towards Boosting Video Popularity via Tag Selection," 4th ACM International Conference on Multimedia Retrieval, Apr. 2, 2014 (9 pages), Apr. 2, 2014.

Zhou, Renjie, "Boosting video popularity through keyword suggestion and recommendation systems", Zhou, et al., "Boosting video popularity through keyword suggestion and recommendation systems," Neurocomputing, 205:529-541 (2016), 2016.

\* cited by examiner

GENERATING MEDIA CONTENT KEYWORDS BASED ON VIDEO-HOSTING WEBSITE CONTENT

CROSS-REFERENCE TO RELATED APPLICATIONS; PRIORITY CLAIM

This application claims benefit under 35 U.S.C. § 120 as a Continuation of U.S. application Ser. No. 17/992,255, filed Nov. 22, 2022, which claims benefit as a Continuation of U.S. application Ser. No. 16/953,133, filed Nov. 19, 2020, (Now U.S. Pat. No. 11,539,994), which claims benefit as a Continuation of U.S. application Ser. No. 16/220,663, filed Dec. 14, 2018, (Now U.S. Pat. No. 10,897,639), the entire contents of each are hereby incorporated by reference for all purposes as if fully set forth herein.

BACKGROUND

The present disclosure relates to systems for generating keywords that facilitate the searching of media content delivery systems for media content, and more particularly to systems and related processes for generating media content keywords based on video-hosting website content.

SUMMARY

Media content delivery systems, such as cable-based, satellite-based, and Internet-based content delivery systems, provide user interfaces by which users can enter keywords to search for desired media content among a plethora of media content made available. For example, such a system may receive a keyword-based query entered via a user input field; search a database, which includes associations between keywords and corresponding media content titles, for any media content identifiers (e.g., titles) that correspond to the query; and return any media content identifiers identified based on the searching. The quality and relevance of keyword-based search results, however, are largely dependent upon the quality and extent of the associations between keywords and corresponding media content identifiers that are included in the database. For example, if a user, not recalling a title of a given movie, queries a content delivery system for that movie by using keywords based on one of its memorable scenes instead of its title, the system would need to have previously generated an association between the entered memorable scene-based keywords and the given movie title to return the sought movie title in reply to that query. Traditional keyword generation techniques rely upon word document frequency analysis and/or backlink reference analysis of limited sources (e.g., the text of a publicly available, brief plot summary of a movie) to generate keywords for media content. Because such limited sources lack descriptions of memorable scenes that users are likely to refer to in searching for media content, search tools that are based upon traditional keyword generation often lack the keyword-to-content associations that would be necessary to generate relevant media content search results in response to queries that, for example, lack a title of the desired content and instead include only keywords that are based on such notable/memorable scenes.

Accordingly, given the vast quantity of media content (or more specifically, media content identifiers) that may be returned in response to a query, it would be desirable to have systems and methods for generating more accurate quantitative indicators of the relevance of keywords to corresponding media content, to enable systems to provide query search results having improved relevance to the query. Additionally, it would be desirable to have improved systems and methods for generating a media content keyword database that includes a comprehensive, accurate list of associations between keywords and corresponding media content identifiers, to increase the chances for systems to provide relevant query results despite the wide variety of keywords that may be queried in a search for media content.

In view of the foregoing, the present disclosure provides systems and related methods that generate media content keywords (e.g., keywords for media programs or other types of content) based on the content of a video-hosting website. For instance, one such system includes control circuitry that is configured to identify, on a video-hosting website, video content items that include at least a portion of a media program. The video content items may be videos or video clips that are related to various scenes or portions of the media program, and that users have uploaded to the video-hosting website. Each of the video content items has a corresponding identifier (e.g., a title that is made up of one or more terms and that may have been defined by the respective users who uploaded the video content items). The media program may also have a corresponding identifier (e.g., a media program identifier or title), and the control circuitry may be configured to identify the video content items that include at least a portion of the media program by searching the video-hosting website for all videos and video clips having a title that includes at least a portion of the media program title. The control circuitry identifies a term (e.g., a keyword or keyword phrase) associated with the media program by identifying a term that is included in more than one of the video content item titles that have been identified as being related to the media program. Once a term associated with the media program has been identified, the control circuitry identifies a group of the video content items that have the identified term included in their title. The group of the video content items, in some examples, may be a subset of the video content items initially identified as being related to the media program (e.g., some of the videos or video clips on the video-hosting website may be related to the media program, but may lack the identified term in their titles). The control circuitry then determines, based on the video-hosting website, a cumulative number of rankings (e.g., likes and/or dislikes) of the group of video content items that have the identified term included in their title. The control circuitry may be configured to generate the cumulative number of rankings, for instance, by retrieving, from the video-hosting website, a respective number of rankings for each of the video content items within the group and computing a sum of the retrieved numbers of rankings. The control circuitry generates a relevance score for the term (e.g., indicating a relevance of the term to the media program) based on the cumulative number of rankings and stores, in a memory, the term and the relevance score in a keyword database in association with the media program identifier.

By relying upon on video clips that were uploaded to a video-hosting website by users and given titles by users as the basis upon which to generate a media program keyword database, the systems and methods herein facilitate the generation of a media program keyword database with more comprehensive, accurate lists of associations between keywords and their corresponding media programs than those of conventional keyword databases. For instance, by using such video clips as the basis upon which to generate a media program database, the systems and methods herein identify (1) scenes or portions of media programs that users deem notable or memorable and that users therefore are likely to use as the basis for a keyword search for those media programs and (2) terms that users themselves use to describe the notable/memorable portions and that users therefore are likely to use as keywords in a subsequent search for the media program.

In some examples, the control circuitry may be configured to receive a query that includes the stored term (and, in some cases, lacks the media program title) and, in response to receiving the query, retrieve, from the keyword database, the media program identifier and the relevance score stored in association with the term. The control circuitry then generates a reply to the query including the media program identifier in a position based on the relevance score. In this manner, for example, the systems and methods described herein, having generated an association between notable scene-based keywords and a given media program title, can return the sought media program title in reply to that query, even though the user, not recalling the media program title, queried the system for the media program by using keywords based on one of its notable scenes instead of its title.

In various aspects, the control circuitry may be configured to generate the relevance score for the term in a variety of ways, to generate more accurate quantitative indicators of the relevance of such keywords to their corresponding media programs. For example, the control circuitry may be configured to determine a number of the video content items within the group (e.g., how many videos and video clips that (1) have been uploaded to the video-hosting website, (2) have the identified term in their title, and (3) are related to the media program) based on the video-hosting website and generate the relevance score for the term based on the number of the video content items within the group. In this manner, for instance, the greater the number of video clips that (1) are uploaded to the video-hosting website, (2) have the identified term (e.g., keyword) in their titles, and (3) are related to the media program, the greater the relevance of that term to the media program (e.g., the greater the relevance score). As another example, the control circuitry may be configured to determine a number of views of the video content items within the group (e.g., how many times users have viewed videos and video clips that (1) have been uploaded to the video-hosting website, (2) have the identified term in their title, and (3) are related to the media program) based on the video-hosting website and generate the relevance score for the term based on the number of views of the video content items within the group. This way, for example, the greater the number of times that users have viewed the video clips that (1) have been uploaded to the video-hosting website, (2) have the identified term (e.g., keyword) in their titles, and (3) are related to the media program, the greater the relevance of that term to the media program (e.g., the greater the relevance score). In a further aspect, the control circuitry may be configured to determine both a number of the video content items within the group and a number of views of the video content items within the group based on the video-hosting website, and generate the relevance score for the term based on both the number of the video content items within the group and the number of views of the video content items within the group.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
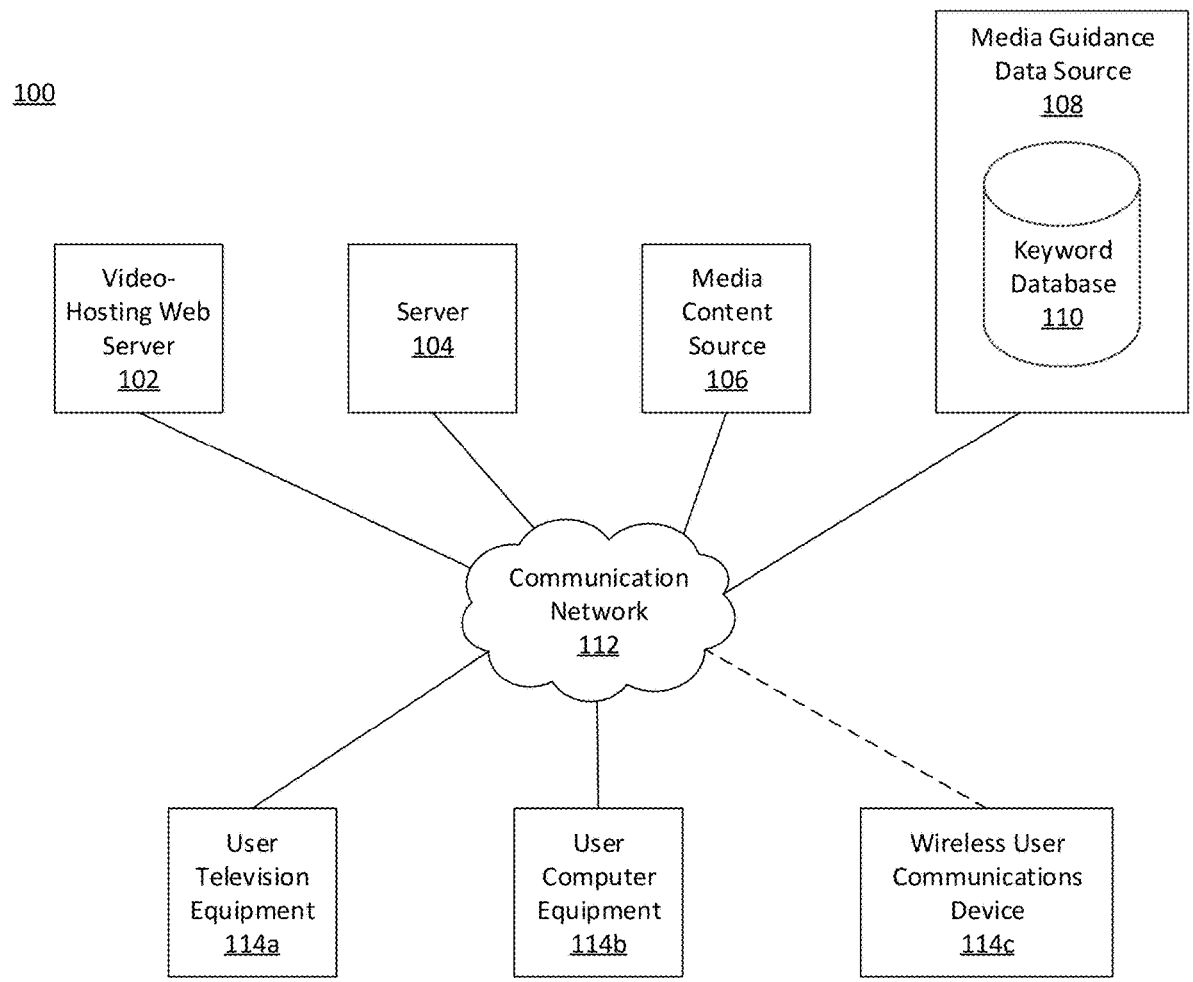
FIG. 1 shows an illustrative block diagram of a system for generating media program keywords based on a video-hosting website, in accordance with some embodiments of the disclosure.

FIG. 1 shows an illustrative block diagram of a system 100 for generating media program keywords based on a video-hosting website, in accordance with some embodiments of the disclosure. In one aspect, system 100 includes one or more of video-hosting web server 102, server 104, media content source 106, media guidance data source 108, and communication network 112. Communication network 112 may be one or more networks including the Internet, a mobile phone network, mobile voice or data network (e.g., a 4G or LTE network), cable network, public switched telephone network, or other types of communication network or combinations of communication networks. Communication network 112 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 112 communicatively couples various components of system 100 to one another. For instance, server 104 may be communicatively coupled to video-hosting web server 102, media content source 106, and/or media guidance data source 108 via communication network 112. Video-hosting web server 102 hosts one or more video-hosting websites, such as YOUTUBE, VIMEO, DAILYMOTION, and/or the like, that enable users to upload videos, video clips, and/or other types of content; provide titles for uploaded content; view uploaded content; and provide rankings for viewed content (e.g., likes, dislikes, scaled ratings such as ratings on a scale from 1 to 5 stars, and/or the like). In addition to enabling users to upload and view content, the video-hosting websites also provide access to data regarding uploaded content, such as the number of times an item of media content has been viewed by users, the number of likes and dislikes (or other ratings) users have given items of media content, and the like.

In some examples, media content source 106 and media guidance data source 108 may be integrated as one device.

Media content source 106 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 106 may be the originator of content (e.g., a television broadcaster, a Webcast provider, etc.) or may not be the originator of content (e.g., an on-demand content provider, an Internet provider of content of broadcast programs for downloading, etc.). Media content source 106 may include cable sources, satellite providers, on-demand providers, Internet providers, over-the-top content providers, or other providers of content. Media content source 106 may also include a remote media server used to store different types of content (e.g., including video content selected by a user) in a location remote from computing device 114 (described below). Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 108 may provide media guidance data, such as the media guidance data described herein, to computing device 114 and/or server 104 using any suitable approach. In some embodiments, media guidance data source 108 may provide a stand-alone interactive television program guide that receives program guide data via a data feed (e.g., a continuous feed or trickle feed). In some examples, media guidance data source 108 may provide program schedule data and other guidance data to computing device 114 on a television channel sideband, using an in-band digital signal, using an out-of-band digital signal, or by any other suitable data transmission technique.

In some embodiments, guidance data from media guidance data source 108 may be provided to computing device 114 using a client/server approach. For example, computing device 114 may pull media guidance data from a server (e.g., server 104), or a server may push media guidance data to computing device 114. In some embodiments, a client application residing on computing device 114 may initiate sessions with media guidance data source 108 to obtain guidance data when needed, e.g., when the guidance data is out-of-date or when computing device 114 receives a request from the user to receive data.

Content and/or media guidance data delivered to computing device 114 may be over-the-top (OTT) content. OTT content delivery allows Internet-enabled user devices, such as computing device 114, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 114.

As described in further detail below, server 104 accesses the content of the video-hosting website(s) hosted by video-hosting web server 102 and, based on the accessed content, generates a variety of types of data and/or metadata (e.g., terms, associations between terms and corresponding media content identifiers, relevance scores indicating the relevance of terms to corresponding media content identifiers, and/or the like) that is stored in keyword database 110 and can be accessed to facilitate the searching of media content made available by media content source 106. System 100 also includes one or more computing devices 114, such as user television equipment 114*a* (e.g., a set-top box), user computer equipment 114*b*, and wireless user communication device 114*c* (e.g., a smartphone device or a remote control), that users can use to interact with server 104, media guidance data source 108, keyword database 110, and/or media content source 106 via communication network 112 to search for desired media content. For instance, in some aspects server 104 may provide a user interface via computing device 114, by which a user can input a keyword-based query for a particular item of media content made available by media content source 106, and generate a response to the query by accessing and/or processing data and/or metadata stored in keyword database 110. Although FIG. 1 shows one of each component, in various examples, system 100 may include multiples of one or more illustrated components. For instance, system 100 may include multiple video-hosting web servers 102 and server 104 may aggregate data from the multiple video-hosting websites hosted by multiple video-hosting web servers 102, respectively, for use in generating keyword database 110.

Figure 2:
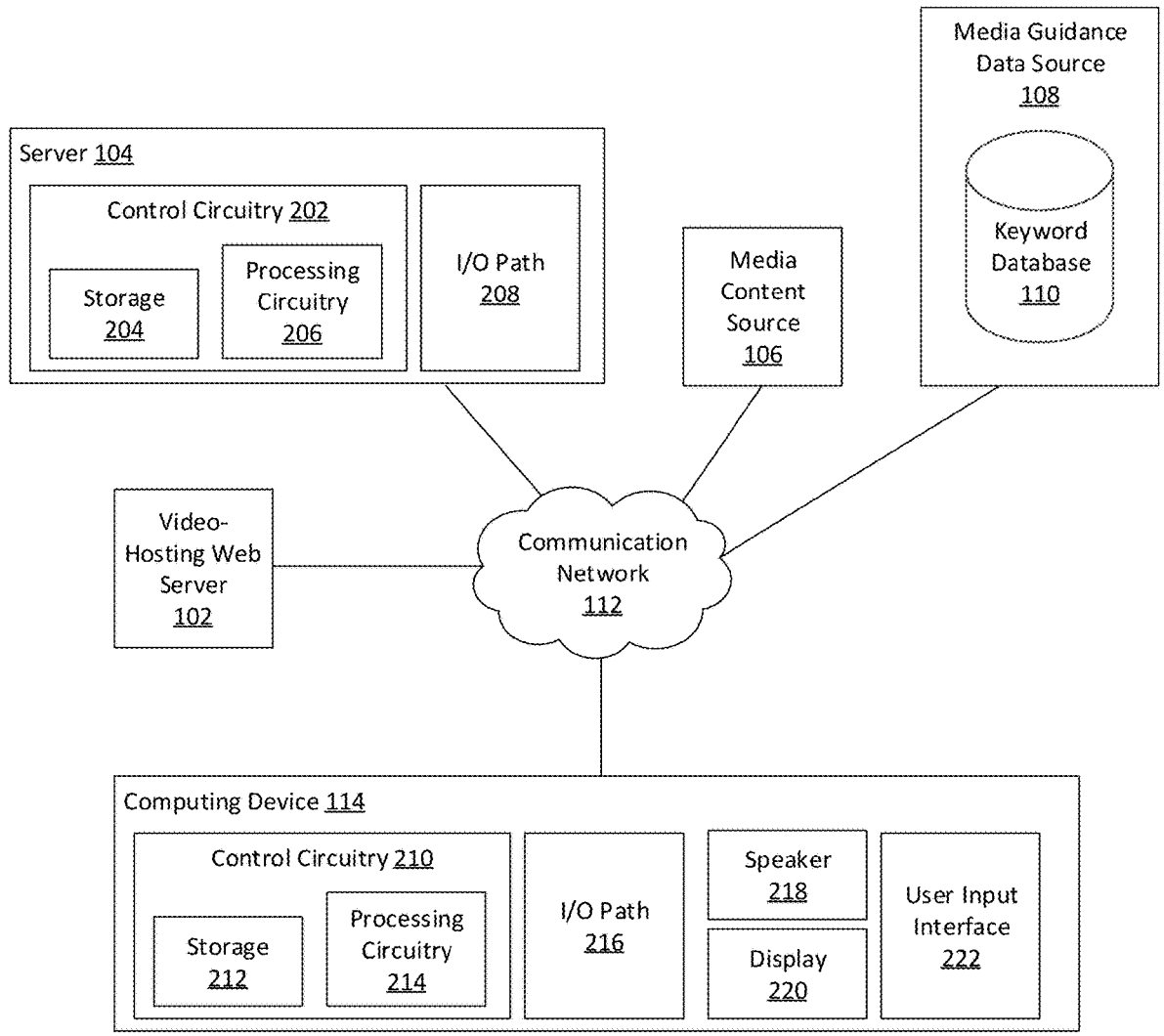
FIG. 2 is an illustrative block diagram showing additional details of the system for generating media program keywords of FIG. 1, in accordance with some embodiments of the disclosure.

FIG. 2 is an illustrative block diagram showing additional details of the system 100 for generating media program keywords of FIG. 1, in accordance with some embodiments of the disclosure. In particular, server 104 includes control circuitry 202 and I/O path 208, and control circuitry 202 includes storage 204 and processing circuitry 206. Computing device 114 includes control circuitry 210, I/O path 216, speaker 218, display 220, and user input interface 222. Control circuitry 210 includes storage 212 and processing circuitry 214. Control circuitry 202 and/or 210 may be based on any suitable processing circuitry such as processing circuitry 206 and/or 214. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storages of other components of system 100 (e.g., storages of media content source 106, media guidance data source 108, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Each of storage 204, storage 212, and/or storages of other components of system 100 may be used to store various types of content, media guidance data, and or other types of data. Non-volatile memory may also be used (e.g., to launch a boot-up routine and other instructions). Cloud-based storage may be used to supplement storages 204, 212 or instead of storages 204, 212. In some embodiments, control circuitry 202 and/or 210 executes instructions for an application stored in memory (e.g., storage 204 and/or 212). Specifically, control circuitry 202 and/or 210 may be instructed by the application to perform the functions discussed herein. In some implementations, any action performed by control circuitry 202 and/or 210 may be based on instructions received from the application. For example, the application may be implemented as software or a set of executable instructions that may be stored in storage 204 and/or 212 and executed by control circuitry 202 and/or 210. In some embodiments, the application may be a client/server application where only a client application resides on computing device 114, and a server application resides on server 104.

The application may be implemented using any suitable architecture. For example, it may be a stand-alone application wholly implemented on computing device 114. In such an approach, instructions of the application are stored locally (e.g., in storage 212), and data for use by the application is downloaded on a periodic basis (e.g., from an out-of-band feed, from an Internet resource, or using another suitable approach). Control circuitry 214 may retrieve instructions of the application from storage 212 and process the instructions to perform the functionality described herein. Based on the processed instructions, control circuitry 214 may determine what action to perform when input is received from user input interface 222.

In client/server-based embodiments, control circuitry 210 may include communication circuitry suitable for communicating with an application server (e.g., server 104) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 112). In another example of a client/server-based application, control circuitry 210 runs a web browser that interprets web pages provided by a remote server (e.g., server 104). For example, the remote server may store the instructions for the application in a storage device. The remote server may process the stored instructions using circuitry (e.g., control circuitry 202) and generate the displays discussed above and below. Computing device 114 may receive the displays generated by the remote server and may display the content of the displays locally via display 220. This way, the processing of the instructions is performed remotely (e.g., by server 104) while the resulting displays are provided locally on computing device 114. Computing device 114 may receive inputs from the user via input interface 222 and transmit those inputs to the remote server for processing and generating the corresponding displays.

A user may send instructions to control circuitry 202 and/or 210 using user input interface 222. User input interface 222 may be any suitable user interface, such as a remote control, trackball, keypad, keyboard, touchscreen, touchpad, stylus input, joystick, voice recognition interface, or other user input interfaces. User input interface 222 may be integrated with or combined with display 220, which may be a monitor, a television, a liquid crystal display (LCD), electronic ink display, or any other equipment suitable for displaying visual images.

Server 104 and computing device 114 may receive content and data via input/output (hereinafter "I/O") path 208 and 216, respectively. I/O paths 208, 216 may provide content (e.g., broadcast programming, on-demand programming, Internet content, content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

Figure 3:
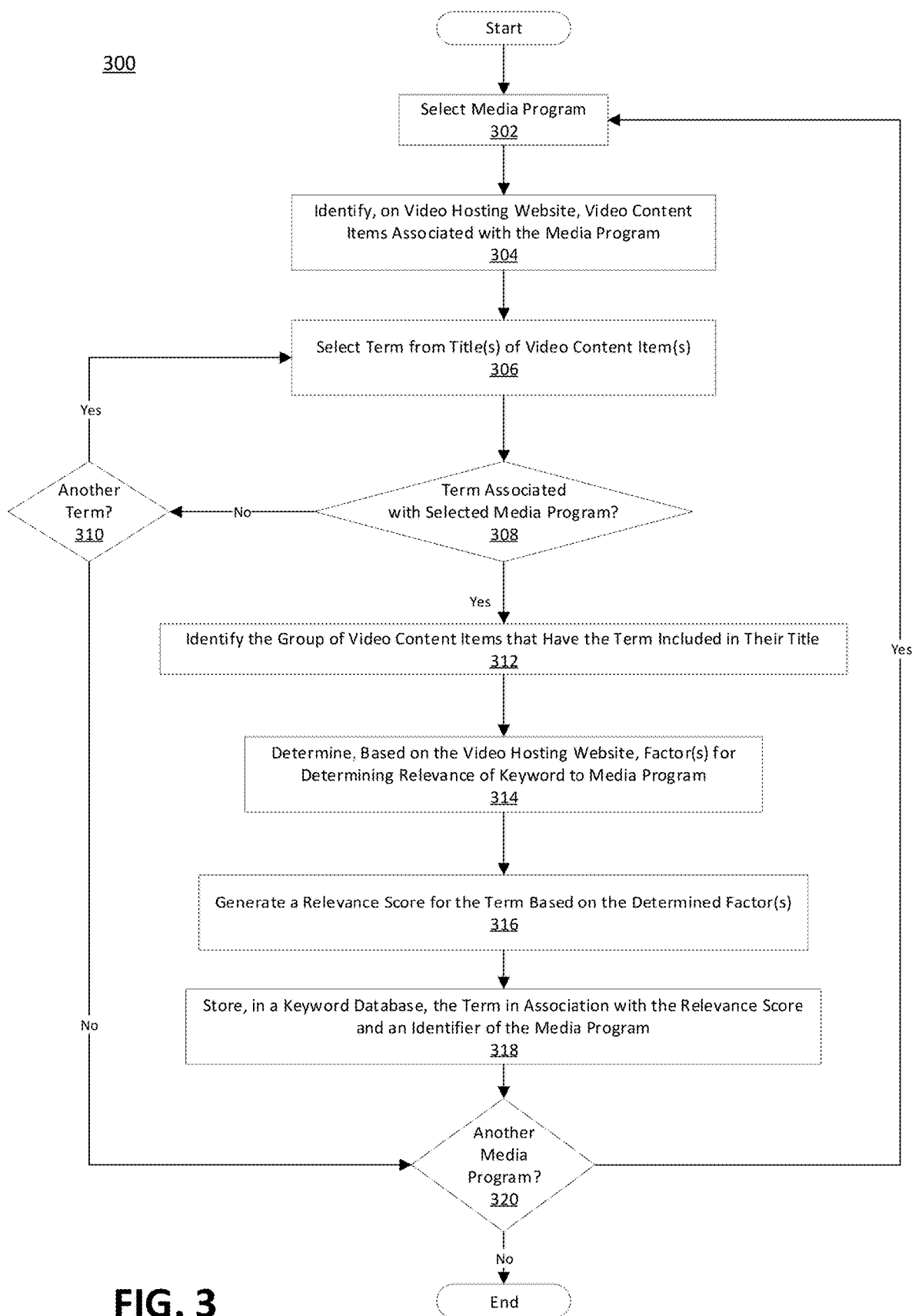
FIG. 3 depicts an illustrative flowchart of a process for generating media program keywords based on a video-hosting website, in accordance with some embodiments of the disclosure.
Figure 4:
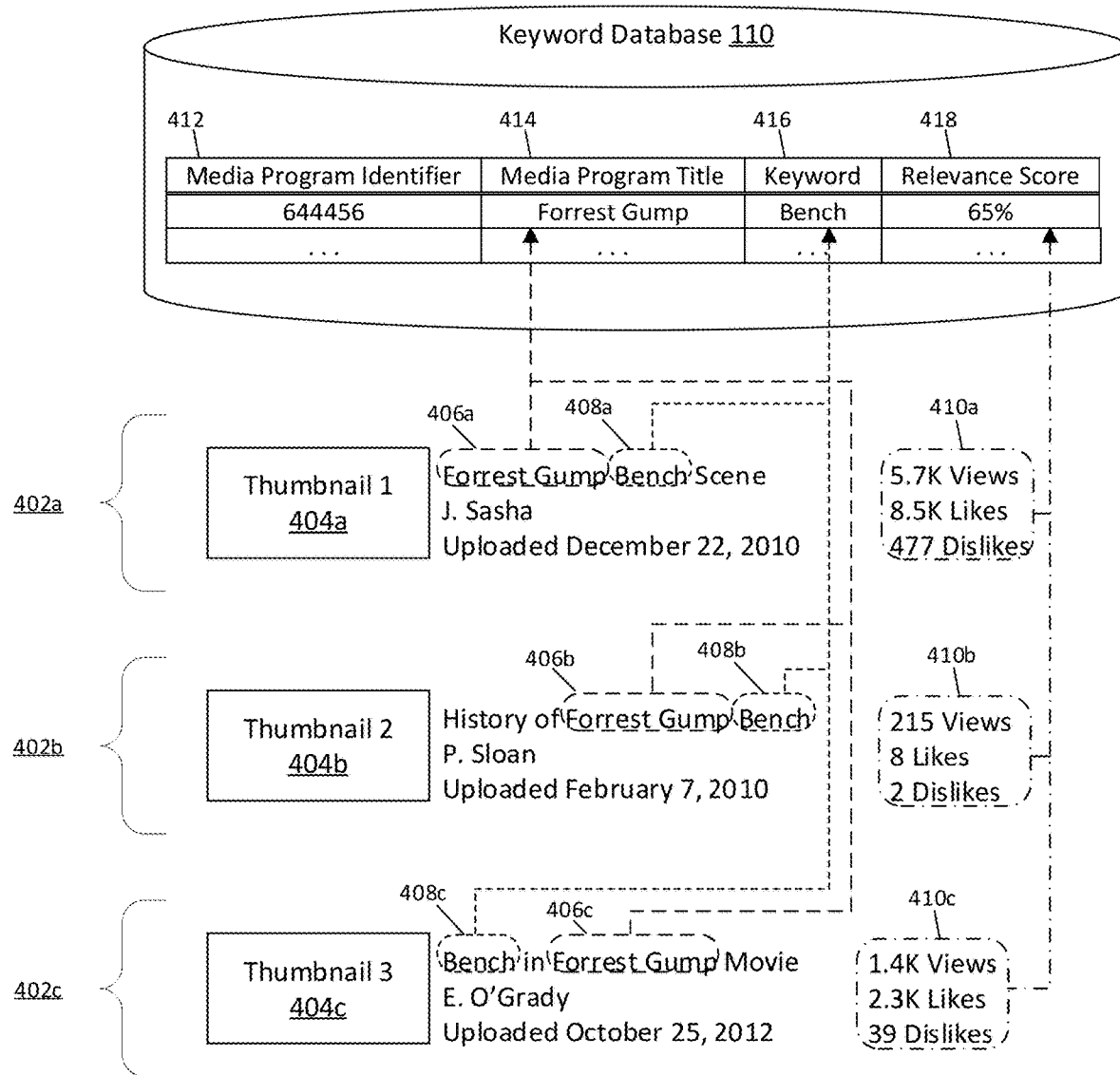
FIG. 4 shows how a keyword database may be generated in accordance with the systems and processes described herein for generating media program keywords based on a video-hosting website, in accordance with some embodiments of the disclosure.

Having described system 100, reference is now made to FIG. 3, which depicts an illustrative flowchart of process 300 for generating media content keywords (e.g., keywords that may be associated with items of media content—such as media programs or any other type of content—and may be used to facilitate keyword-based searching for such items of media content) based on a video-hosting website that may be implemented by using system 100 in accordance with some embodiments of the disclosure. Reference is also made to FIG. 4, which shows how a keyword database may be generated by system 100 and process 300, in accordance with some embodiments. As will be apparent from the present disclosure, the system 100 and processes (e.g., 300, 316, 600) described herein embody a solution that is necessarily rooted in computer technology (e.g., database query handling) and that overcomes a problem (e.g., the inability of traditional search tools to provide relevant query results in response to certain types of queries, such as queries that lack the terms in a title of a sought item of media content) that specifically arises in the realm of such computer technology. Process 300, for instance, recites specific steps that accomplish a result (e.g., generation of a keyword database that, together with an unconventional algorithm, enables the system to provide relevant query results in response to a wide variety of queries for media content items, even queries that lack the terms in a title of a sought item of media content) that addresses the problem arising from conventional technology. As described in further detail herein, the systems and processes described herein accomplish such results at least in part by using an aggregated and large set of data (e.g., user-created video content items and related data) as the basis upon which to identify and store associations between keywords and related items of media content, and using a specific algorithm to determine the relevance of such keywords to media content items.

At 302, control circuitry 202 selects an item of media content (e.g., by selecting a media program and/or a media program identifier, such as a title or other identifier that can be used to uniquely identify the media program) for which to generate keywords. Example types of media programs include, without limitation, movies, television shows, videos, and the like. Although the present disclosure is provided in the context of generating keywords for media programs, this disclosure is similarly applicable to generating keywords for any type of content. In some embodiments, a list of media program identifiers that correspond to media programs available from media content source 106 may be stored in a storage (e.g., a storage of media content source 106 (not shown in FIG. 1 or FIG. 2), storage 204, and/or another storage). In such embodiments, control circuitry 202 may select at 302 a media program identifier from the stored list. As described below (at 320), control circuitry 202 may systematically step through the stored list of media program identifiers, repeating the keyword generation process for all (or many of the) media programs made available by media content source 106, to generate a keyword database 110 that includes a comprehensive list of associations between keywords and their corresponding media programs, thereby enabling system 100 to provide relevant query results in response to a wide variety of keywords.

At 304, control circuitry 202 identifies, on the video-hosting website hosted by video-hosting web server 102, all (or many of the) uploaded video content items that are associated with the media program identifier selected at 302. For example, the video content items identified at 304 may be videos or video clips that are related to (and/or include) various scenes or portions of the selected media program, and that users have uploaded to the video-hosting website. Each video content item uploaded to the video-hosting website has a corresponding identifier, such as a title that is made up of one or more terms and that was defined by the user who uploaded the respective video content item. In some examples, at 304, control circuitry 202 may be configured to retrieve the title of the selected media program (e.g., from media content source 106, media guidance data source 108, and/or another source) and identify the video content items that are associated with the selected media program by searching the video-hosting website for all videos and video clips having a title (e.g., "Forrest Gump," which is shown in 406a, 406b, 406c of FIG. 4) that includes at least a portion of the media program title.

A lower portion of FIG. 4 includes an illustration of how video content items (such as those that may be identified at 304) may be presented on the video-hosting website. In particular, each video content item may have a corresponding display element 402a, 402b, 402c (collectively 402) that presents (e.g., when the website is accessed via a web browser) information regarding the video content item. For instance, the display elements 402a, 402b, 402c may include various types of information, such as information related to the uploading of the video content item (e.g., thumbnail images 404a, 404b, 404c that are representative of the video content item, metadata associated with the video content items, such as titles including one or more terms defined by the respective uploaders of the video content items, authors, and upload dates) and viewer-inputted information regarding the video content items that viewers input after the video content items have been uploaded (e.g., numbers of times user have viewed the video content items, rankings of the video content items such as likes, dislikes, and/or other types of rankings, and/or the like).

Referring back to FIG. 3, at 306, control circuitry 202 selects a term (e.g., the term "bench," which is shown in 408a, 408b, 408c of FIG. 4) from among the terms of the titles (or descriptions, and/or the like, depending on availability and/or implementation) of the video content items identified at 304 as being related to the media program selected at 302, to determine whether that term should be stored as a keyword that is associated with the selected media program and/or media program identifier. The term may be a single word or may be a phrase that includes multiple words. Control circuitry 202, in various embodiments, may exclude from selection at 306 terms such as "a," "the," and the like that are deemed too common to be of practical use as keywords. In some implementations, control circuitry 202 systematically steps through all the terms of the titles of the video content items identified at 304, repeating at least portions of process 300 for each term to determine whether each of those terms should be stored as a keyword for the selected media program identifier. In such implementations, for example, control circuitry 202 may generate at 304 a list of all the terms of the titles (e.g., as retrieved from the video-hosting website) of the video content items identified at 304 so that control circuitry 202 may systematically step through the terms of that list to complete the keyword generation processing for the selected media program.

At 308, control circuitry 202 determines whether the term selected at 306 is associated with the selected media program and thus should be stored in keyword database 110 as a keyword for that media program. In some examples, the term may be deemed associated with the media program if that term is included in at least a threshold number (or a threshold percentage) of the video content items identified at 304 as being related to the media program. If the term is included in less than the threshold number (or the threshold percentage) of the video content items identified at 304 as being related to the media program, then that term is deemed unassociated with the media program. In such examples, control circuitry 202 may be configured to determine whether the term selected at 306 is included in at least the threshold number (or threshold percentage) of the video content items identified at 304 as being related to the media program.

If control circuitry 202 determines that the selected term is not associated with the selected media program ("NO" at 308), then at 310, control circuitry 202 excludes that term from being associated with the media program in keyword database 110 and then determines whether there is an additional term, from among the terms of the titles of the video content items identified at 304 (e.g., by referring to the term list that may be generated at 304), that should be processed to determine whether the additional term should be stored as a keyword that is associated with the selected media program. If control circuitry 202 determines that there is an additional term to be processed to determine whether the additional term should be stored as a keyword that is associated with the selected media program ("YES" at 310), then control passes back to 306 to process the additional term in the manner described above. If control circuitry 202 determines that there is no additional term to be processed ("NO" at 310), then the keyword generation process for the media program selected at 302 is complete and control passes to 320 (described below) to determine whether an additional media program remains to be processed for keyword generation.

If control circuitry 202 determines at 308 that the term selected at 306 is associated with the selected media program ("YES" at 308), then the term is deemed a keyword to be stored (at 318, discussed below) in keyword database 110 (e.g., under a keyword field 416, as shown in FIG. 4), in association with the identifier of the media program (e.g., stored under a media program identifier field 412, as shown in FIG. 4), and along with other types of related data, if any, such as the title of the media program (e.g., stored under a media program title field 414, as shown in FIG. 4). At 312, control circuitry 202 identifies which of the video content items identified at 304 as being associated with the media program have the selected term included in their title. Control circuitry 202 may generate a list of the group of video content items identified at 312 as having the selected term included in their title. Because some of the video content items on the video-hosting website, although related to the media program, may lack the identified term in their titles, the group of the video content items identified at 312 may be a subset of the video content items identified at 304 as being related to the media program.

At 314, control circuitry 202 determines, based on the video-hosting website, one or more factors to be used to determine a degree of relevance (e.g., a relevance score) of the term (which has been designated a keyword) to the media program. At 316, control circuitry 202 generates a relevance score for the term (e.g., indicating a relevance of the term to the media program) based on the one or more factor(s) determined at 314. Additional details regarding how control circuitry 202 may generate the relevance score at 316 and example types of factors that may be used to generate the relevance score are provided below in the context of FIG. 5. At 318, control circuitry 202 stores the term selected at 306 and the corresponding relevance score generated at 316 (e.g., stored under a relevance score field 418, as shown in FIG. 4) in keyword database 110 in association with the media program identifier.

At 320, control circuitry 202 determines whether an additional media program remains to be processed for keyword generation. For instance, control circuitry 202 may refer to the stored list (mentioned above) of media program identifiers that correspond to media programs available from media content source 106 to determine whether an additional media program remains to be processed for keyword generation. If control circuitry 202 determines that an additional media program remains to be processed for keyword generation ("YES" at 320), then control passes back to 302 to repeat the keyword generation functionality of process 300 for the additional media program in the manner described above. If control circuitry 202 determines that no additional media program remains to be processed for keyword generation ("NO" at 320), then the keyword generation process for the media programs made available by media content source 106 is completed and process 300 terminates.

Figure 5:
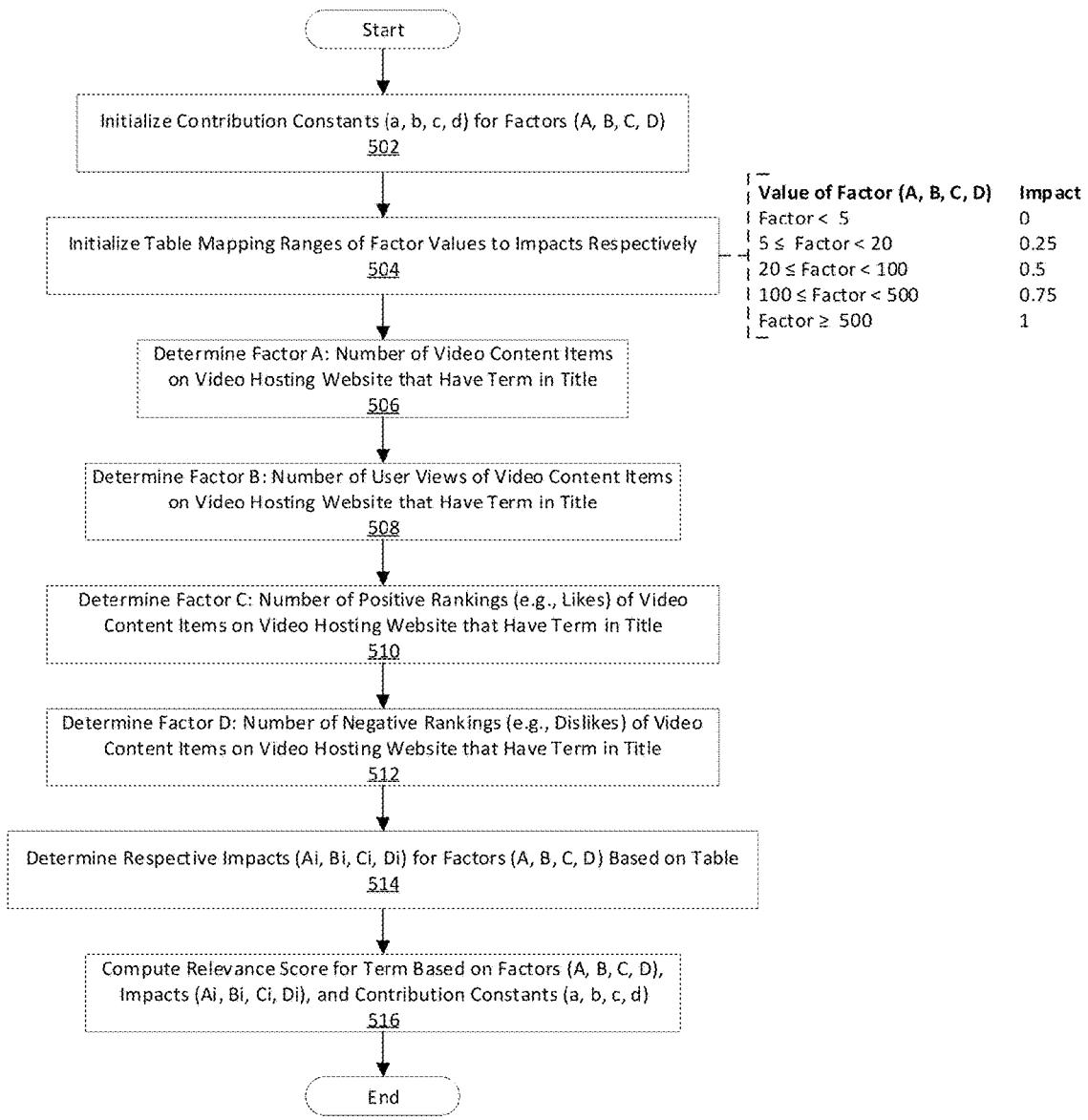
FIG. 5 is a flowchart of an illustrative process for generating a relevance score for a term or keyword, in accordance with some embodiments of the disclosure.

FIG. 5 is a flowchart showing an illustrative process 316 for generating a relevance score for a term or keyword, as part of process 300, in accordance with some embodiments of the disclosure. Control circuitry 202 may, in various implementations, be configured to generate the relevance score for the term in a variety of ways, based on any one or a combination of a variety of factors, to generate more accurate quantitative indicators of the relevance of such keywords to their corresponding media programs. Example types of factors that may be used to generate the relevance score include: (factor A) a total number of the video content items that have been identified at 304 as being related to the media program and identified at 312 as having the selected term included in their title (e.g., how many video content items have been uploaded to the video-hosting website, and have the identified term in their title, and are related to the media program); (factor B) a number of views (e.g., by viewers) of the video content items that have been identified at 304 as being related to the media program and identified at 312 as having the selected term included in their title (e.g., a total number of times viewers have viewed those video content items); and/or ranking data regarding the video content items that have been identified at 304 as being related to the media program and identified at 312 as having the selected term included in their title, such as (factor C) a number of positive rankings (e.g., likes) that viewers have inputted for those video content items; and (factor D) a number of negative rankings (e.g., dislikes) that viewers have inputted for those video content items. In various embodiments, and as described in further detail below, control circuitry 202 may retrieve items of viewer-inputted metadata (e.g., as shown in 410*a*, 410*b*, 410*c* of FIG. 4) from the video-hosting website for use in determining the one or more factors (A, B, C, and D) to be used to determine the relevance score for the term. Although process 316 is shown in FIG. 5 as generating a relevance score based on a combination of multiple factors A, B, C, and D, any one or any combination of two or more of the described factors may be used to generate a relevance score. For instance, in some examples, instead of using the positive and negative rankings as separate factors, control circuitry 202 may use a cumulative number of positive and negative rankings (e.g., likes and dislikes) as a factor in computing the relevance score.

At 502, control circuitry 202 initializes contribution constants (denoted as contribution constants a, b, c, and d herein for case of reference) for factors A, B, C, and D, respectively. The contribution constants a, b, c, and d, are used to weight or scale the respective impacts that factors A, B, C, and D have on the relevance score. The contribution constants a, b, c, and d can be set as desired, and in some aspects constant values of the contribution constants a, b, c, and d are used to generate the respective relevance scores of all keywords stored in keyword database 110. In some embodiments, the contribution constants may be omitted from process 316, thereby resulting in the unweighted impacts of all factors (e.g., A, B, C, and D) being used. In other embodiments, the contribution constants a, b, c, and d are different from one another, resulting in differently weighted impacts for factors A, B, C, and D. As one example, the contribution constant a may be set to a value (e.g., between 0 and 1) that is greater than the value of the contribution constant b (e.g., also between 0 and 1), which may be greater than the contribution constant c (e.g., also between 0 and 1), which may be equal to the contribution constant d, and the sum of the contribution constants a, b, c, and d may be set equal to 1. In this manner, the impact of factor A will be weighted more heavily on the generated relevance score than the impact of factor B, which will be weighted more heavily on the generated relevance score than the impact of factors C and D.

At 504, control circuitry 202 initializes a table that maps ranges of values of factors (e.g., A, B, C, and D) to corresponding impact values (e.g., $A_i$, $B_i$, $C_i$, and $D_i$). A non-limiting example of such a table that control circuitry 202 may generate at 504 is shown in FIG. 5. For instance, according to the table shown in FIG. 5, if the value of the factor is determined (in the manner described below) to be less than 5, then that factor has an impact value of 0 (e.g., resulting in no impact on the generated relevance score); if the value of the factor is determined to fall in a range that is greater than or equal to 5 but less than 20, then that factor has an impact value of 0.25; if the value of the factor is determined to fall in a range that is greater than or equal to 20 but less than 100, then that factor has an impact value of 0.5; if the value of the factor is determined to fall in a range that is greater than or equal to 100 but less than 500, then that factor has an impact value of 0.75; and if the value of the factor is determined to fall in a range that is greater than or equal to 500, then that factor has an impact value of 1.

At 506, control circuitry 202 determines factor A, by computing a total number (e.g., a sum) of the video content items that have been identified (e.g., at 304) as being related to the media program and identified (e.g., at 312) as having the selected term included in their title (e.g., how many video content items have been uploaded to the video-hosting website, and have the identified term in their title, and are related to the media program).

At 508, control circuitry 202 retrieves from the video-hosting website (e.g., from fields 410*a*, 410*b*, and 410*c* of FIG. 4) respective numbers of views (e.g., by viewers) of the video content items that have been identified (e.g., at 304) as being related to the media program and identified (e.g., at 312) as having the selected term included in their title, and computes, as factor B, a sum of all the respective numbers of views (e.g., a total number of times viewers have viewed all of the video content items identified at 304). By using factor B in computing the relevance score, for example, the greater the number of times that users have viewed the video clips that (1) have been uploaded to the video-hosting website, (2) have the identified term (e.g., keyword) in their titles, and (3) are related to the media program, the greater the relevance of that term to the media program will be reflected in the relevance score.

At 510, control circuitry 202 retrieves from the video-hosting website (e.g., from fields 410*a*, 410*b*, and 410*c* of FIG. 4) respective numbers of positive rankings (e.g., likes) that viewers have inputted for the video content items that have been identified (e.g., at 304) as being related to the media program and identified (e.g., at 312) as having the selected term included in their title, and computes, as factor C, a sum of all the respective numbers of positive rankings (e.g., a total number of times viewers have liked all of the video content items identified at 304).

At 512, control circuitry 202 retrieves from the video-hosting website (e.g., from fields 410*a*, 410*b*, and 410*c* of FIG. 4) respective numbers of negative rankings (e.g., dislikes) that viewers have inputted for the video content items that have been identified (e.g., at 304) as being related to the media program and identified (e.g., at 312) as having the selected term included in their title, and computes, as factor D, a sum of all the respective numbers of negative rankings (e.g., a total number of times viewers have disliked all of the video content items identified at 304).

At 514, control circuitry 202 determines the impacts $A_i$, $B_i$, $C_i$, and $D_i$ of the factors A, B, C, and D, based on the table generated at 504. For example, control circuitry 202 may identify the range of values within which a factor falls and identify the impact value indicated in the table as corresponding to the identified range of values. At 516, control circuitry 202 computes the relevance score for the term based on the contribution constants a, b, c, and d, and the impact values $A_i$, $B_i$, $C_i$, and $D_i$, which were determined based at least in part upon the factors A, B, C, and D. As one example, the relevance score for the keyword may be computed at 516 according to equation (1) below.

$$\text{Relevance Score} = (a \times A_i + b \times B_i + c \times C_i - d \times D_i) \times 100 \quad (1)$$

Figure 6:
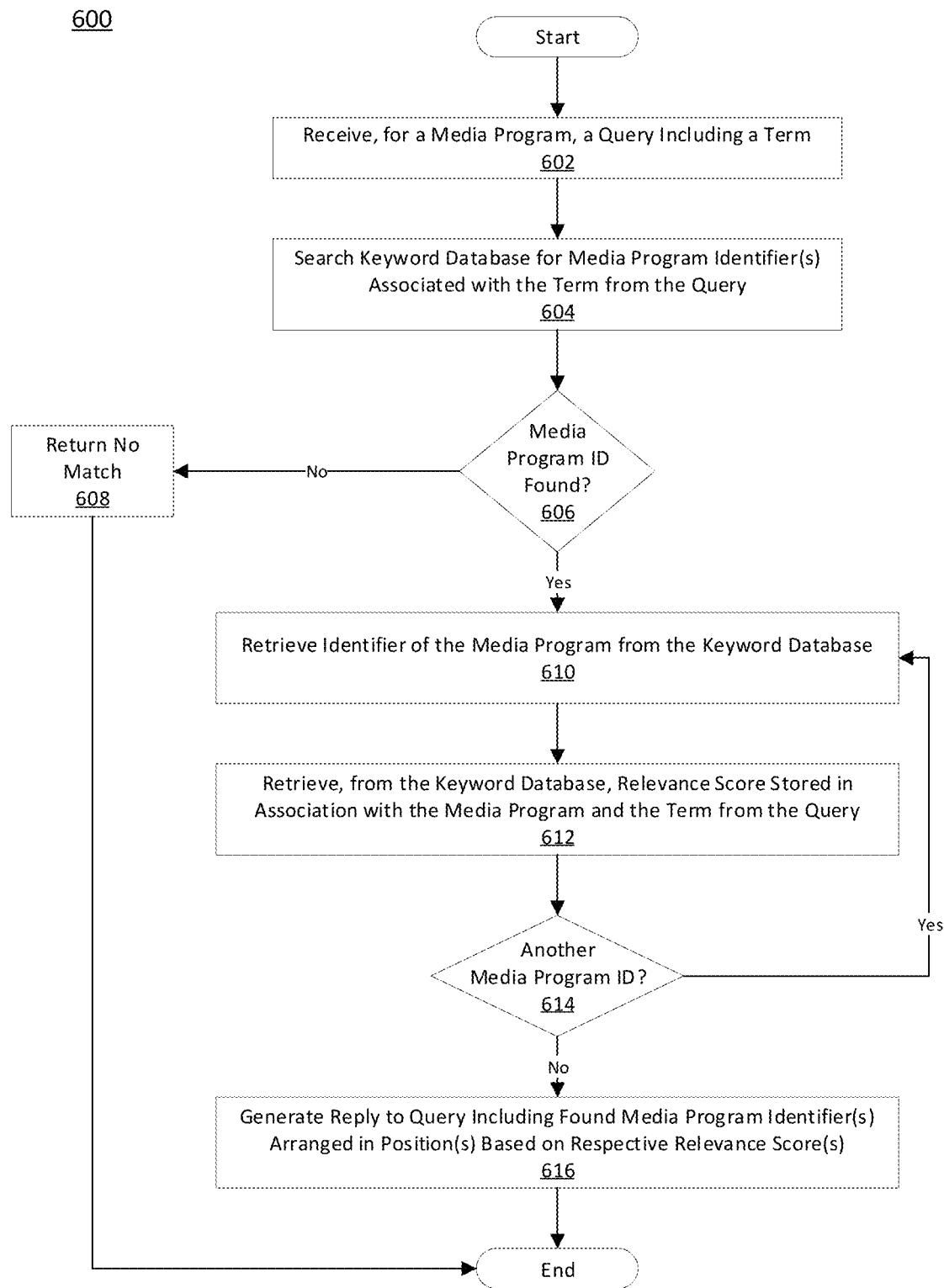
FIG. 6 is a flowchart of an illustrative process for handling a query for a media program by using a keyword database generated in accordance with some embodiments of the disclosure.

FIG. 6 is a flowchart of an illustrative process 600 for handling a query for a media program by using a keyword database such as keyword database 110 generated by using system 100 and/or process 300, in accordance with some embodiments of the disclosure. At 602, control circuitry 202 may be configured to receive a query for a media program title (e.g., entered via user input interface 222 of computing device 114 and communicated to server 104 via communication network 112). The query, in this example, includes one or more terms or keywords but lacks a title of the media program.

At 604, control circuitry 202 searches keyword database 110 to identify a media program identifier (e.g., title), if any, that is stored in association with the term or keyword included in the query received at 602. If control circuitry 202 does not identify at 604 any media program identifier that is stored in keyword database 110 in association with the queried term ("NO" at 606), then at 608 control circuitry 202 generates a reply to the query (e.g., for display via display 220) indicating that the query did not yield any results. If control circuitry 202 identifies at 604 a media program identifier that is stored in keyword database 110 in association with the queried term ("YES" at 606), then control passes to 610, at which control circuitry 202 retrieves the identified media program identifier from keyword database 110, then at 612, control circuitry 202 retrieves the relevance score (e.g., generated according to process 316) stored in keyword database 110 in association with the identified media program identifier.

At 614, control circuitry 202 searches keyword database 110 again to determine whether any additional media program identifier is stored in association with the term or keyword included in the query received at 602. If control circuitry 202 identifies at 614 an additional media program identifier that is stored in keyword database 110 in association with the queried term ("YES" at 614), then control passes back to 610 and 612 to retrieve the media program identifier and corresponding relevance score from keyword database 110 in the manner described above. If control circuitry 202 does not identify at 614 any additional media program identifier that is stored in keyword database 110 in association with the queried term ("NO" at 614), then at 616 control circuitry 202 generates a reply to the query (e.g., for display via display 220) including the found media program identifiers, which, in some cases, may be arranged in positions according to their respective relevance scores (e.g., sorted in order from highest relevance score to lowest relevance score).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
identifying, by control circuitry, on a video-hosting website, video content items that include at least a portion of a media program, the media program having a media program identifier and each of the video content items having a corresponding title including one or more respective terms;
identifying, by the control circuitry, from among the one or more terms, a term included in more than one of the titles;
determining, by the control circuitry, a relevance score based on a plurality of relevance factors for the term included in more than one of the titles; and
determining an impact value of each of the plurality of relevance factors on the relevance score, wherein determining the impact value further comprises:
retrieving viewer-inputted metadata from the video-hosting website for determining the plurality of relevance factors;
associating each of the plurality of relevance factors with a plurality contribution constants, wherein each contribution constant, from the plurality of contribution constants, has a value that is different from the value of another contribution constant; and
determining the impact value of each of the plurality of relevance factors on the relevance score based on the value of each contribution constants associated with each of the plurality of relevance factors.

2. The method of claim 1, further comprising, calculating the relevance score based on the impact value of each of the plurality of relevance factors on the relevance score.

3. The method of claim 1, further comprising:
mapping the relevance factors to corresponding impact values; and
initializing a table that maps ranges of values of the relevance factors to the corresponding impact values.

4. The method of claim 1, wherein the viewer-inputted metadata includes numbers of views by users of the video content items having the corresponding title including one or more respective terms.

5. The method of claim 1, wherein the viewer-inputted metadata includes ranking of the video content items based on a number of likes and dislikes associated with the video content items.

6. The method of claim 1, further comprising:
associating a media program identifier with the term; and
storing the media program identifier associated with the term and the relevance score for the term in a keyword database.

7. The method of claim 6, further comprising;
receiving a query that includes the term;
in response to receiving the query, retrieving, from the keyword database, the media program identifier and the relevance score associated with the term; and
generating a reply to the query, the reply including the media program identifier in a position based on the relevance score.

8. The method of claim 1, further comprising:
associating a plurality of media program identifiers with the term; and
storing each media program identifier, from the plurality of media asset identifiers, and its associated relevance score in a keyword database.

9. The method of claim 8, further comprising ranking the plurality of media asset identifiers based on their relevance score.

10. The method of claim 1, wherein the term identified, from among the one or more terms, is a phrase included in more than one of the titles.

11. A system comprising:
communications circuitry configured to communicate with a video-hosting website that hosts a plurality of video content items; and
control circuitry configured to:
identify on the video-hosting website, the plurality of video content items that include at least a portion of a media program, the media program having a media program identifier and each of the plurality of video content items having a corresponding title including one or more respective terms;
identify from among the one or more terms, a term included in more than one of the titles;
determine a relevance score based on a plurality of relevance factors for the term included in more than one of the titles; and
determine an impact value of each of the plurality of relevance factors on the relevance score, wherein determining the impact value further comprises:
retrieve viewer-inputted metadata from the video-hosting website for determining the plurality of relevance factors;
associate each of the plurality of relevance factors with a plurality contribution constants, wherein each contribution constant, from the plurality of contribution constants, has a value that is different from the value of another contribution constant; and
determine the impact value of each of the plurality of relevance factors on the relevance score based on the value of each contribution constants associated with each of the plurality of relevance factors.

12. The system of claim 11, further comprising, control circuitry configured to calculate the relevance score based on the impact value of each of the plurality of relevance factors on the relevance score.

13. The system of claim 11, further comprising, control circuitry configured to:
map the relevance factors to corresponding impact values; and
initialize a table that maps ranges of values of the relevance factors to the corresponding impact values.

14. The system of claim 11, wherein the viewer-inputted metadata includes numbers of views by users of the plurality of video content items having the corresponding title including one or more respective terms.

15. The system of claim 11, wherein the viewer-inputted metadata includes ranking of the video content items based on a number of likes and dislikes associated with the video content items.

16. The system of claim 11, further comprising, control circuitry configured to:
associate a media program identifier with the term; and
store the media program identifier associated with the term and the relevance score for the term in a keyword database.

17. The system of claim 16, further comprising, control circuitry configured to;
receive a query that includes the term;
in response to receiving the query, retrieve, from the keyword database, the media program identifier and the relevance score associated with the term; and generate a reply to the query, the reply including the media program identifier in a position based on the relevance score.

18. The system of claim 11, further comprising, control circuitry configured to:
associate a plurality of media program identifiers with the term; and
store each media program identifier, from the plurality of media asset identifiers, and its associated relevance score in a keyword database.

19. The system of claim 18, further comprising. control circuitry configured to rank the plurality of media asset identifiers based on their relevance score.

20. The system of claim 11, wherein the term identified, from among the one or more terms, is a phrase included in more than one of the titles.

* * * * *